United States Patent [19]

Morimoto

[11] Patent Number: 4,583,446
[45] Date of Patent: Apr. 22, 1986

[54] PNEUMATIC BOOSTER

[75] Inventor: Hideyuki Morimoto, Yokosuka, Japan

[73] Assignee: Nippon Air Brake Co., Ltd., Japan

[21] Appl. No.: 706,927

[22] Filed: Feb. 28, 1985

[30] Foreign Application Priority Data

Mar. 5, 1984 [JP] Japan .............................. 59-32156[U]

[51] Int. Cl.⁴ ................................................ F15B 9/10
[52] U.S. Cl. .................. 91/369 A; 91/376 R
[58] Field of Search ............. 91/369 C, 369 A, 369 B, 91/369 R, 376 R; 60/547.1, 554

[56] References Cited

U.S. PATENT DOCUMENTS

| 4,402,256 | 9/1983 | Ando | 91/369 C |
| 4,425,760 | 1/1984 | Furuta | 91/369 C |
| 4,472,997 | 9/1984 | Ohmi | 91/369 C |

FOREIGN PATENT DOCUMENTS

| 149248 | 11/1981 | Japan | 91/369 C |
| 107945 | 7/1982 | Japan | 91/369 C |

Primary Examiner—Paul E. Maslousky

Attorney, Agent, or Firm—Kane, Dalsimer, Kane, Sullivan and Kurucz

[57] ABSTRACT

A pneumatic booster includes a movable wall mounted in a hollow body to divide the interior of the body into a low pressure chamber and a high pressure chamber, the movable wall having an internal bore extending therethrough. An input member is movably received in the bore and carries a plunger. A valve member is selectively engageable with a first valve seat formed on the plunger and a second valve seat formed on the surface of the bore for controlling a pressure differential between the low and high pressure chambers. At least one pin slidably extends through the movable wall and is engageable with a rear wall of the body for allowing the movable wall to move rearwardly relative to the pin. An operating member has a tubular portion slidably received in the bore and is connected to the pin for movement therewith. An output member and a load-transmitting member for transmitting a load to the output member in response to a forward movement of the input member are received in the tubular portion. A plurality of projections extend radially inwardly from the rear end of the tubular portion for engagement with the plunger for limiting the rearward movement of the plunger relative to the operating member.

6 Claims, 4 Drawing Figures

PNEUMATIC BOOSTER

BACKGROUND OF THE INVENTION

1. Field of the Invention

This invention relates to a pneumatic booster for assisting in operating a master cylinder of brake and clutch systems of a vehicle or the like.

2. Prior Art

One conventional booster under consideration comprises a hollow body having front and rear walls; a movable wall mounted in the hollow body to divide the interior of the body to a front low pressure chamber and a rear high pressure chamber, the movable wall being movable relative to the body along an axis thereof, the movable wall having a rear portion slidably extending through the rear wall of the body, and the movable wall having an internal bore extending along the axis of the body and passing through the rear portion; an elongated input member extending into the internal bore from its rear end and being movable forwardly; a plunger mounted in the internal bore and connected to a front end of the input member for moving therewith, the plunger having a first valve seat at its rear end, and a second valve seat being formed on the surface of the internal bore; a valve member mounted within the internal bore for sealing engagement with the first and second valve seats; an output member received in a front end of the internal bore; and load-transmitting means interposed between the output member and the plunger for engagement therewith. In accordance with the forward movement of the input member relative to the movable wall, the positions of the first and second valve seats relative to the valve member are so controlled as to release, maintain and develop a pressure differential between the low and high pressure chambers. In an inoperative condition of the booster, the valve member is spaced considerably from the second valve seat. Upon forward movement of the input member for initiating the operation of the booster, the valve member is brought out of engagement with the first valve seat and brought into engagement with the second valve seat to bring the booster into its pressure differential-developing condition in which the pressure differential develops between the low and high pressure chambers. The above-mentioned spacing of the valve member from the second valve seat in the inoperative condition of the booster retards the initiation of the operation of the booster. In order to improve this retarding, it has been proposed to hold the valve member in engagement with the second valve seat in the inoperative condition of the booster under the influence of a return spring.

One conventional means for improving this retarding as shown in U.S. Pat. No. 4,398,449 comprises a rod extending through the interior of the hollow body axially thereof and fixed to the front and rear walls thereof, and a generally rectangular plate disposed perpendicularly to the rod, the plate having at its outer end an aperture slidably fitted on the rod and having at its inner end a slot received in a peripheral groove formed in the plunger in such a manner as to allow an axial movement of the plunger relative to the plate, the groove having a pair of axially opposed front and rear walls. The rod has a shoulder adjacent to the rear wall of the hollow body with which shoulder the plate is engageable to limit its rearward movement. With this construction, upon rearward movement of the input member, the outer end of the plate is brought into engagement with the shoulder under the bias of the return spring, and the front wall of the groove of the plunger is brought into engagement with the inner end of the plate to limit the rearward movement of the plunger so that the movable wall is allowed to further move rearwardly relative to the plunger to bring the valve member into engagement with the second valve seat in the inoperative condition of the booster. However, as described above, the plate engages the plunger at its inner end and engages the rod at its outer end. Therefore, the plate tends to become displaced from the plane perpendicular to the axis of the plunger, so that the plunger is also inclined relative to the axis of the internal bore. As a result, the first valve seat on the plunger is partly spaced from the valve member during the movement of the plunger to develop an undesirable pressure leakage. In addition, the inclination of the plunger causes damage to the surface of the internal bore during its movement.

SUUMMARY OF THE INVENTION

It is therefore an object of this invention to provide a pneumatic booster of the type in which the retarding of the initiation of the operation of the booster due to a play in the valve arrangement is eliminated without affecting a proper axial movement of the plunger.

According to the present invention, there is provided a pneumatic booster which comprises a hollow body having front and rear walls and having an axis therethrough; a movable wall mounted in the hollow body to divide the interior of the body to a front low pressure chamber connectable to a low pressure source and a rear high pressure chamber communicable with a high pressure source, the movable wall being movable relative to the body along the axis thereof, the movable wall having a rear portion extending slidably through the rear wall of the body, and the movable wall having an internal bore extending therethrough and passing through the rear portion; an elongated input member extending into the internal bore from its rear end and being movable forwardly; a plunger mounted within the internal bore and connected to a front end of the input member for moving therewith, the plunger having a first valve seat at its rear end, and a second valve seat being formed on the surface of the internal bore; a valve member mounted within the internal bore for sealing ingagement with the first and second valve seats, the movable wall having a first passageway for communicating the high pressure chamber with the high pressure source when the valve member is spaced from the first valve seat, and a second passageway for communicating the low pressure chamber with the high pressure chamber when the valve member is spaced from the second valve seat; an output member received in a front end of the internal bore; load-transmitting means interposed between the output member and the plunger for engagement with the output member at its front end and with the movable wall and the plunger at its reat end; and means for limiting a rearward movement of the plunger, whereby upon forward movement of the input member, the first valve seat is moved away from the valve member, and the plunger urges the output member forwardly via the load-transmitting means; the means for limiting the rearward movement comprising at least one pin slidably extending through the movable wall along the axis of the internal bore and being engageable with the rear wall of the hollow body for allowing said movable wall to move rearwardly relative to said pin; and an operating member having a major tubular portion received in the front end of the internal bore for sliding movement therealong, the operating member being connected to the front end of the pin for movement therewith, the output member and the load-transmitting means being received in the tubular portion, a plurality of projections extending radially inwardly from the rear end of the tubular portion for engagement with the plunger for limiting a rearward movement of the plunger relative to the operating member.

DESCRIPTION OF THE PREFERRED EMBODIMENT OF THE INVENTION

Figure 1:
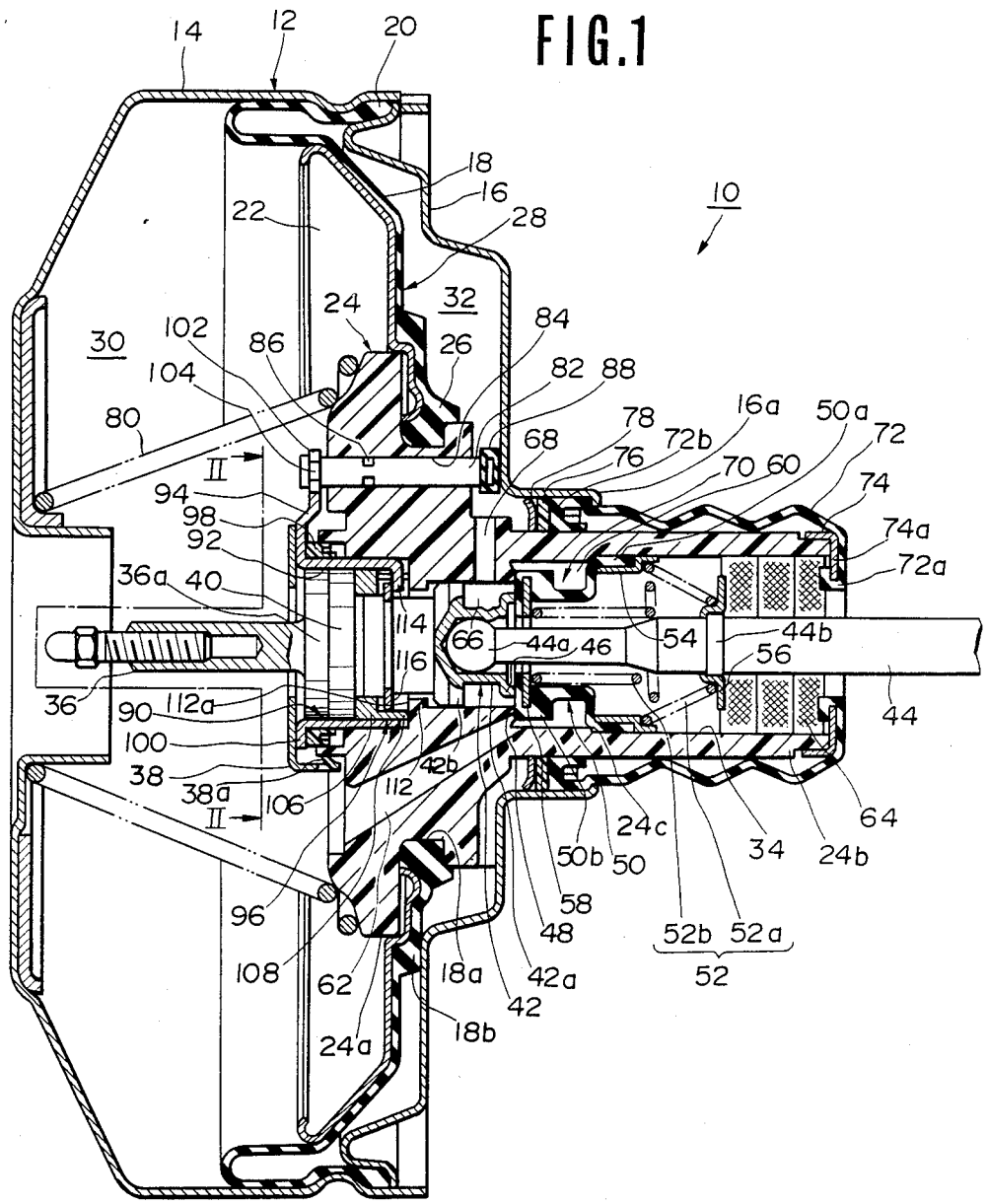
FIG. 1 is a cross-sectional view of a pneumatic booster provided in accordance with the present invention.

A pneumatic or vacuum-type booster 10 shown in FIG. 1 comprises a hollow body 12 composed of generally cup-shaped front and rear shells 14 and 16 which are connected together at their outer peripheral portions. An elastic diaphragm 18 having a central opening 18a is disposed within the hollow body 12 with an outer peripheral bead 20 thereof clamped between the outer peripheral portions of the front and rear shells 14 and 16.

A generally dish-shaped plate member 22 having a central opening is attached to one radial face of the diaphragm 18 facing the front shell 14 through a hub member 24 which extends through the central opening 18a of the diaphragm 18 and is secured to an inner peripheral bead 26 thereof. The diaphragm 18 and the hub member 24 constitute a movable wall 28 which is movable along an axis of the booster body 12. The movable wall 28 divides the interior of the body 12 to a front low pressure chamber 30 and a rear high pressure chamber 32. The body 12 is supported on a vehicle body (not shown) with the rear shell 16 fixedly secured thereto by bolts and nuts. A master cylinder (not shown) is connected to the front shell 14 by bolts and nuts in an air-tight manner as is well known in the art. The hub member 24 includes a front base portion 24a of a generally disc-shape secured to the inner peripheral bead 26 of the diaphragm 18, and a rear portion 24b of a reduced diameter extending rearwardly from the front portion 24a in coaxial relation thereto, the rear portion 24b extending outwardly through a central opening of the rear shell 16.

The hub member 24 has an internal bore 34 extending therethrough along an axis thereof so that the rear portion 24b is in the form of a tube. An output member or rod 36 is received in the front end of the bore 34 and secured to the hub member 24 by a retaining member 38. The front end of the output rod 36 is engaged in a recess in a rear end of a piston (not shown) of the master cylinder. The retaining member 38 has radially-directed pawls 38a which are resiliently engaged with the front end of the hub member 24 to hold the output rod 36 in position. A rubber disc 40 serving as a load-transmitting member, a plunger 42 and an input member or rod 44 are disposed in the bore 34 of the hub member 24 rearwardly of the output rod 36. The plunger 42 has a rear portion 42a in the form of a socket, and the input rod 44 has a ball-shaped front end 44a which is received in the rear portion 42a of the plunger 42 in a manner to allow a swinging movement of the input rod 44 but not to allow an axial movement thereof relative to the plunger 42, so that the plunger 42 is axially movable together with the input rod 44. The plunger 42 has a first valve seat 46 on a rear end of the socket-shaped rear portion 42a, and a second valve seat 48 is formed on the surface of the internal bore 34 adjacent to the front portion 24a of the hub member 24. A poppet valve member 50 of a generally tubular shape is mounted in the tubular portion 24b and is sealingly engageable with the first and second valve seats 46 and 48 at its front end.

The poppet valve member 50 of an elastic material has a rear portion 50a held against a shoulder 24c on the surface of the internal bore 34, and a front portion 50b of a reduced diameter which is axially expandable. A coil spring 52 acts between the input rod 44 and the poppet valve member 50, and comprises a truncated cone-shaped rear portion 52a acting between the rear end of the valve member 50 and an intermediate flange 44b of the input rod 44 through retaining rings 54 and 56, and a cylindrical front portion 52b disposed in the poppet valve member 50 and acting on the front end 50b of the valve member 50 through a ring 58 to urge it toward the plunger 42. The ring 58 also serves to reinforce the front end of the valve member 50. An annular space 60 is formed between the outer periphery of the front portion 50b of the poppet valve member 50 and the inner surface of the rear tubular portion 24b of the hub member 24 and is in constant communication with the low pressure chamber 30 via a passageway 62 formed through the front portion 24a of the hub member 24. The low pressure chamber 30 is connected to a low pressure source or vacuum source such as an intake manifold of the vehicle engine via a conduit (not shown). The interior of the poppet valve member 50 is in constant communication with the atmosphere or high pressure source via a filter 64 fitted in the rear end of the bore 34 of the hub member 24. Another annular space 66 is formed between the outer periphery of the rear portion 42a of the plunger 42 and the surface of the bore 34 and is in constant communication with the high pressure chamber 32 via a passageway 68 formed in the front portion 24a of the hub member 24.

The poppet valve member 50, the plunger 42, the hub member 24, the input member 44 and the spring 52 constitute a valve arrangement 70. The valve 70 is in a pressure differential-releasing position when the valve member 50 is seated on the first valve seat 46 and is spaced apart from the second valve seat 48, that is to say, when the low pressure chamber 30 is in communication with the high pressure chamber 32 with the high pressure chamber 32 isolated from the atmosphere. In this pressure differential-releasing position of the valve 70, a pressure differential between the low and high pressure chambers 30 and 32 is not created. The valve 70 is in a pressure differential-maintaining position when the valve member 50 is seated on both of the first and second valve seats 46 and 48, that is to say, when the communication of the high pressure chamber 32 with the low pressure chamber 30 and the communication of the high pressure chamber 32 with the atmosphere are interrupted. In this pressure differential-maintaining position of the valve 70, the pressure differential between the low and high pressure chambers 30 and 32 is maintained at a predetermined level. The valve 70 is in a pressure differential-developing position when the valve member 50 is held apart from the first valve seat 46 and is seated on the second valve seat 48, that is to say, when the communication of the low pressure chamber 30 with the high pressure chamber 32 is interrupted with the high pressure chamber 32 communicating with the atmosphere. The plunger 42, which is axially movable relative to the movable wall 28 over a given range, is disposed at the left (as viewed in FIG. 1) limit of this range when the valve 70 is in the pressure differential-developing position, and also is disposed at the right limit of the range when the valve 70 is in the pressure differential-releasing position. The rear end of the input rod 44 is pivotally connected to a pedal (not shown) by a pin.

The rear shell 16 has a rear central tubular portion 16a of a reduced diameter. The tubular rear portion 24b of the hub member 24 accommodating the parts of the valve 70 extends outwardly through the tubular portion 16a. An axially expandable cover member 72 of a generally tubular shape is fitted over the tubular portion 24b of the hub member 24. A flanged ring 74 is secured to the rear end of the tubular portion 24b, and a rear end flange 72a of the cover member 72 is secured to a flange 74a of the ring 74. A front end flange 72b of the cover member 72 having a U-shaped cross-section is hermetically clamped between the coaxially-disposed tubular portions 16a and 24b. The rear end of the tubular portion 16a is directed radially inwardly to prevent the front end flange 72b from becoming disengaged therefrom. A support ring 76 of a plastics material and a retaining ring 78 of a resilient material are mounted around the tubular portion 24b adjacent to the front end flange 72b of the cover member 72. The tubular portion 24b is slidable relative to the front end flange 72b, the support ring 76 and the retaining ring 78.

A preload coil spring 80 is received in the front shell 14 and acts between an inner radial surface of the front shell 14 and the front end of the hub member 24 to urge the movable wall 28 rearwardly under a preload. Therefore, in an inoperative condition of the booster 10, the movable wall 28 is urged rearwardly under the influence of the coil spring 80, so that lib portions 18b of the diaphragm 18 is held against an inner radial surface of the rear shell 16.

Figure 2:
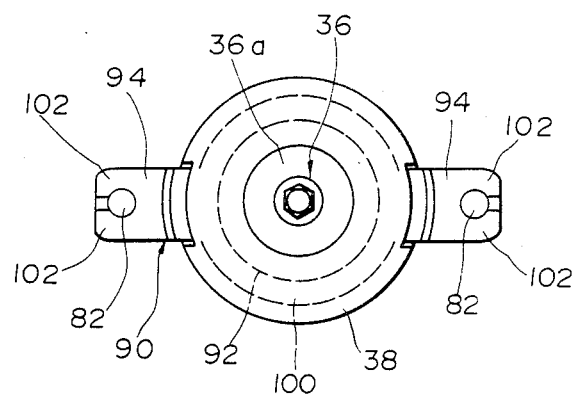
FIG. 2 is a cross-sectional view taken along the line II—II of FIG. 1 showing an operating member.

According to an important aspect of the present invention, there is provided means for limiting the rearward movement of the plunger 42 which means will not affect a proper axial forward movement of the plunger 42 relative to the movable wall 28. More specifically, a pair of pins 82 are slidably received respectively in holes 84 formed axially through the front portion 24a of the hub member 24 at an outer peripheral portion thereof. A seal ring 86 is mounted around each pin 82, and a cap 88 of rubber is fitted on the rear end of each pin 82 disposed in the high pressure chamber 32. Each cap 88 is engageable with the inner surface of the rear shell 16. An operating member 90 has a major tubular portion 92 slidably received in the front end of the internal bore 34 of the hub member 24, and a pair of diametrically opposed arms 94 extending radially outwardly from the outer end of the tubular portion 92. A rear disc portion 36a of the output rod 36, the rubber disc 40 and an auxiliary member 96 of a generally tubular shape are received in the tubular portion 92 of the operating member 90. A seal ring 98 is mounted around the tubular portion 92 and is held in position by a flange 100 formed on the front end of the operating member 90. As best shown in FIG. 2, each of the arms 94 of the operating member 90 has at its outer end a pair of opposed resiliently-deformable pawls 102 which are fitted in a peripheral groove 104 formed in the front end of each pin 82 to connect the operating member 90 to the pins 82. Therefore, the pins 82 are movable axially together with the operating member 90.

Figures 3A, 3B:
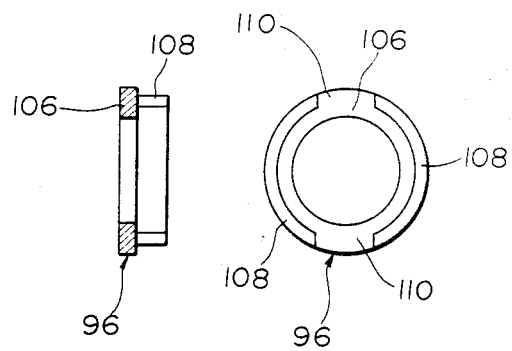
FIG. 3A is a cross-sectional view of an auxiliary member.
FIG. 3B is a plan view of the auxiliary member.

As shown in FIG. 3, the auxiliary member 96 serving as a load-transmitting member has a tubular portion 106 and a pair of arcuate projections 108 spaced by a diametrically opposed recessed 110 and extending rearwardly from the tubular portion 106. The arcuate projections 108 of the auxiliary member 96 are engageable with a shoulder defined by a front radial surface of a smallest-diameter portion 112 of the internal bore 34, and the front end of the auxiliary member 96 is engageable with rubber disc 40. The plunger 42 is received in the smallest-diameter portion 112 and is engageable with the rubber disc 40 at its front end. A pair of diametrically opposed projections 114 extend radially inwardly from the rear end of the tubular portion 92 of the operating member 90 and extend respectively into the pair of recesses 110 between the arcuate projections 108 of the auxiliary member 96. The projections 114 are engageable with a rear surface of a C-shaped retaining member 116 mounted around the plunger 42 adjacent to its front end and disposed perpendicularly to the axis of the plunger 42. With this arrangement, the retaining member 116 is engageable with the projections 114 to limit the rearward movement of the plunger 42 relative to the movable wall 28. A larger-diameter portion 42b of the plunger 42 disposed intermediate the opposite ends thereof is engageable with a shoulder 112a defined by a rear radial surface of the smallest-diameter portion 112 to limit the forward movement of the plunger 42 relative to the movable wall 28.

The pins 82 and the operating member 90 are of such construction that the movable wall 28 is rearwardly movable relative to the plunger 42 to bring the second valve seat 48 into engagement with the valve member 50. And, the second seat 48 is held in sealing engagement with the valve member 50 in this manner in the inoperative condition of the booster 10.

The pins 82 and the operating member 90 cooperate with each other to limit the rearward movement of the plunger 42 in such a manner that the valve member 50 is seated on both of the first and second valve seats 46 and 48 in the inoperative condition of the booster 10. This eliminates the retarding of the initiation of the operation of the booster 10.

A mode of operation of the booster 10 will now be described.

When the pedal (not shown) connected to the input rod 44 is operated to move the input rod 44 forwardly, the valve 70 is brought into the pressure differential-developing position. As a result, the movable wall 28 is moved forwardly against the bias of the preload spring 80 under the influence of the pressure differential between the low and high pressure chamber 30 and 32, and therefore the output rod 36 is subjected to a force applied by the movable wall 28 via the auxiliary member 96 and the rubber disc 40 and also subjected to an input force applied by the input rod 44 via the plunger 42 and the rubber disc 40. Thus, the output rod 36 is subjected to these forces to move the piston (not shown) of the master cylinder to produce a pressure in the master cylinder. Then, when the force or input applied by the input rod 44 and a reaction force transmitted to the plunger 42 via the rubber disc 40 are balanced, the valve 70 is brought into the pressure differential-maintaining position, so that the pressure produced in the master cylinder is maintained at a constant level. During this operation, the pins 82 are subjected to the pressure differential to be urged forwardly, and the operating member 90 is urged forwardly due to an increased friction between the operating member 90 and the compressed rubber disc 40. However, this will not affect the operation of the booster 10.

When the pedal connected to the input rod 44 is deactivated, the input rod 44 is moved rearwardly under the influence of the spring 52. This rearward movement of the input rod 44 causes the plunger 42 to move rearwardly to bring the retaining member 116 into engagement with the projections 114 of the operating member 90, so that the operating member 90 and the pins 82 are moved rearwardly until the projections 114 are brought into engagement with the front shoulder 112a of the smallest-diameter portion 112 of the internal bore 34. Thus, the plunger 42 is brought into its rearmost position by the engagement of the projections 114 with the retaining member 116 whereupon the valve 70 is brought into its pressure differential-releasing position. This condition is maintained immediately before the movable wall 28 is brought into engagement with the rear shell 16 under the bias of the preload spring 80 as a result of the communication of the low pressure chamber 30 with the high pressure chamber 32 to release the pressure differential therebetween. When the valve 70 is brought into the pressure differential-releasing position, the air in the high pressure chamber 32 is drawn to the vacuum source via the low pressure chamber 30 so that the two chambers 30 and 32 are maintained at the same pressure or vacuum.

The pins 82 are moved rearwardly together with the movable wall 28, and the caps 88 secured to the rear ends of the pins 82 are brought into contact with the rear shell, so that the movable wall 28 is further moved rearwardly relative to the pins 82 into contact with the rear shell 16. During this rearward movement of the movable wall 28, the spacing between the second valve seat 48 and the valve member 50 is gradually reduced and when the movable wall 28 is brought into engagement with the rear shell 16, the valve member 50 are seated on both of the first and second valve seats 46 and 48 as shown in FIG. 1.

During the above operation, when the plunger 42 is moved axially, the pins 82 are moved axially, and the tubular portion 92 is moved axially along the internal bore 34. Therefore, the plunger 42 is positively prevented from being inclined relative the axis of the bore 34, thereby ensuring that the valve member 50 can be properly seated on the first valve seat 46. The proper axial movement of the plunger 42 can be achieved by the fact that the operating member 90 acting on the plunger 42 can be moved properly axially. The operating member 90 is subjected to forces at its inner and outer ends, that is, at the projections 114 and the arms 94. The length of that portion of the internal bore 34 receiving the tubular portion 92 and the length of the holes 84 receiving the pins 82 are sufficiently great that the tubular portion 92 and the pins 82 are hardly inclined relative to the axis of the plunger 42, thereby preventing an undesirable inclination of the plunger 42 relative to the axis of the internal bore 34.

While the booster according to the present invention has been specifically shown and described herein, the invention itself is not to be restricted by the exact showing of the drawings or description thereof. For example, the following modifications can be made without departing from the scope of the invention:

(1) The pair of pins 82 may be replaced by a single pin. Even one pin can achieve the intended purpose in cooperation with the tubular portion 92 of the operating member 90. Also, more than two pins may be used.

(2) The operating member 90 has the pair of diametrically opposed projections 114 engageable with the plunger 42. Circumferentially equally spaced three or four projections 114 may be provided on the operating member 90. Also, the projections 114 may be increased circumferentially, in which case the pair of recesses 110 of the auxiliary member 96 are corresponding increased circumferentially to receive the projections 114, respectively.

(3) The front and rear shoulders of the smallest-diameter portion 112 of the hub 24 are abutted by the associated parts repeatedly, and therefore protective rings of metal or the like may be mounted on these shoulders to prevent damage thereto.

What is claimed is:
1. In a pneumatic booster comprising:
   (a) a hollow body having front and rear walls and having an axis therethrough;
   (b) a movable wall mounted in said hollow body to divide the interior of said body into a front low pressure chamber connectable to a low pressure source and a rear high pressure chamber communicable with a high pressure source, said movable wall being movable relative to said body along the axis thereof, said movable wall having a rear portion extending slidably through said rear wall of said body, and said movable wall having an internal bore extending therethrough and passing said rear portion;
   (c) an elongated input member extending into said bore from its rear end and being movabe forwardly;
   (d) a plunger mounted within said bore and connected to a front end of said input member for moving therewith, said plunger having a first valve seat at its rear end, and a second valve seat being formed on a surface of said bore;
   (e) a valve member mounted within said bore for sealing engagement with said first and second valve seats, said movable wall having a first passageway for communicating said high pressure chamber with said high pressure source when said valve member is spaced from said first valve seat, and a second passageway for communicating said low pressure chamber with said high pressure chamber when said valve member is spaced from said second valve seat;
   (f) an output member received in a front end of said bore;
   (g) load-transmitting means interposed between said output member and said plunger for engagement with said output member at its front end and with said movable wall and said plunger at its rear end; and
   (h) means for limiting a rearward movement of said plunger;
   (i) whereby upon forward movement of said input member, said first valve seat is moved away from said valve member, and said plunger urges said output member forwardly via said load-transmit- ting means; the improvement wherein said means for limiting the rearward movement comprises at least one pin slidably extending through said movable wall along the axis of said bore and being engageable with said rear wall of said body for allowing said movable wall to move rearwardly relative to said pin; and an operating member having a major tubular portion received in the front end of said bore for sliding movement therealong, said operating member being connected to the front end of said pin for movement therewith, said output member and said load-transmitting means being received in said tubular portion, and a plurality of projections extending radially inwardly from the rear end of said tubular portion for engagement with said plunger for limiting a rearward movement of said plunger relative to said operating member.

2. A pneumatic booster according to claim 1, in which said tubular portion of said operating member is disposed in coaxial relation to said plunger.

3. A pneumatic booster according to claim 1, in which said operating member has a plurality of arms disposed exteriorly of the front end of said bore and extending radially outwardly from said tubular portion in circumferentially spaced relation to one another, said means for limiting the rearward movement comprising a plurality of pins connected at their front ends to said arms, respectively.

4. A pneumatic booster according to claim 1, in which said radially inwardly-extending projections of said operating member are spaced circumferentially of said tubular portion.

5. A pneumatic booster according to claim 1, in which said load-transmitting means comprises a rubber disc for engagement at its front face with the rear end of said output member, and a tubular auxiliary member engageable at its front end with the rear surface of said rubber disc, said plunger being received in said auxiliary member at its front end for engagement with the rear surface of said rubber disc, and a shoulder being formed on the surface of said bore and being engageable with the rear end of said auxiliary member for urging it against said rubber disc.

6. A pneumatic booster according to claim 1, in which said plunger has a retaining member fixedly mounted on an outer periphery thereof and disposed perpendicularly to the axis of said plunger, said retaining member being engageable with said projections of said operating member for limiting a rearward movement of said plunger relative to said operating member.

* * * * *